United States Patent [19]

Schmid et al.

[11] 4,063,546
[45] Dec. 20, 1977

[54] HEAT STORE AND INSTALLATION FOR THE UTILIZATION OF SOLAR ENERGY

[75] Inventors: Rolf Schmid, Gelterkinden; Ursula Kreibich, Riehen, both of Switzerland

[73] Assignee: Ciba-Geigy Corporation, Ardsley, N.Y.

[21] Appl. No.: 759,143

[22] Filed: Jan. 13, 1977

Related U.S. Application Data

[63] Continuation of Ser. No. 680,303, April 26, 1976, abandoned.

[30] Foreign Application Priority Data

Apr. 28, 1975 Switzerland .................. 5445/75

[51] Int. Cl.² .................. F24J 3/02; C09K 3/18
[52] U.S. Cl. .................. 126/271; 126/400; 252/70
[58] Field of Search .................. 252/67, 70, 71; 126/270, 271, 400; 237/1 A; 165/18

[56] References Cited

U.S. PATENT DOCUMENTS

| | | | |
|---|---|---|---|
| 3,400,249 | 9/1968 | Mekjean et al. | 126/400 X |
| 3,780,262 | 12/1973 | Rudd | 126/400 X |
| 3,931,806 | 1/1976 | Hayes | 126/400 |

FOREIGN PATENT DOCUMENTS

| | | | |
|---|---|---|---|
| 2,010,241 | 2/1970 | France | 126/400 |

*Primary Examiner*—Kenneth W. Sprague
*Attorney, Agent, or Firm*—Karl F. Jorda

[57] ABSTRACT

A heat accumulator is provided which has a heat exchanger embedded in a crystalline substance and has a maximum operating temperature greater than the melting point of the crystalline substance. The latter and the heat exchanger are integrated in a moulding bonded by means of crosslinked plastic. Preferably, the crosslinked plastic is crystalline and, at the same time, forms the crystalline substance. There is also provided an installation for the utilization of solar energy. The installation comprises a heat accumulator as described hereinbefore, a useful-heat exchanger and a solar energy absorber, which are connected together to form a heat transfer circuit. The installation is of particular use for the production of warm water.

27 Claims, 1 Drawing Figure

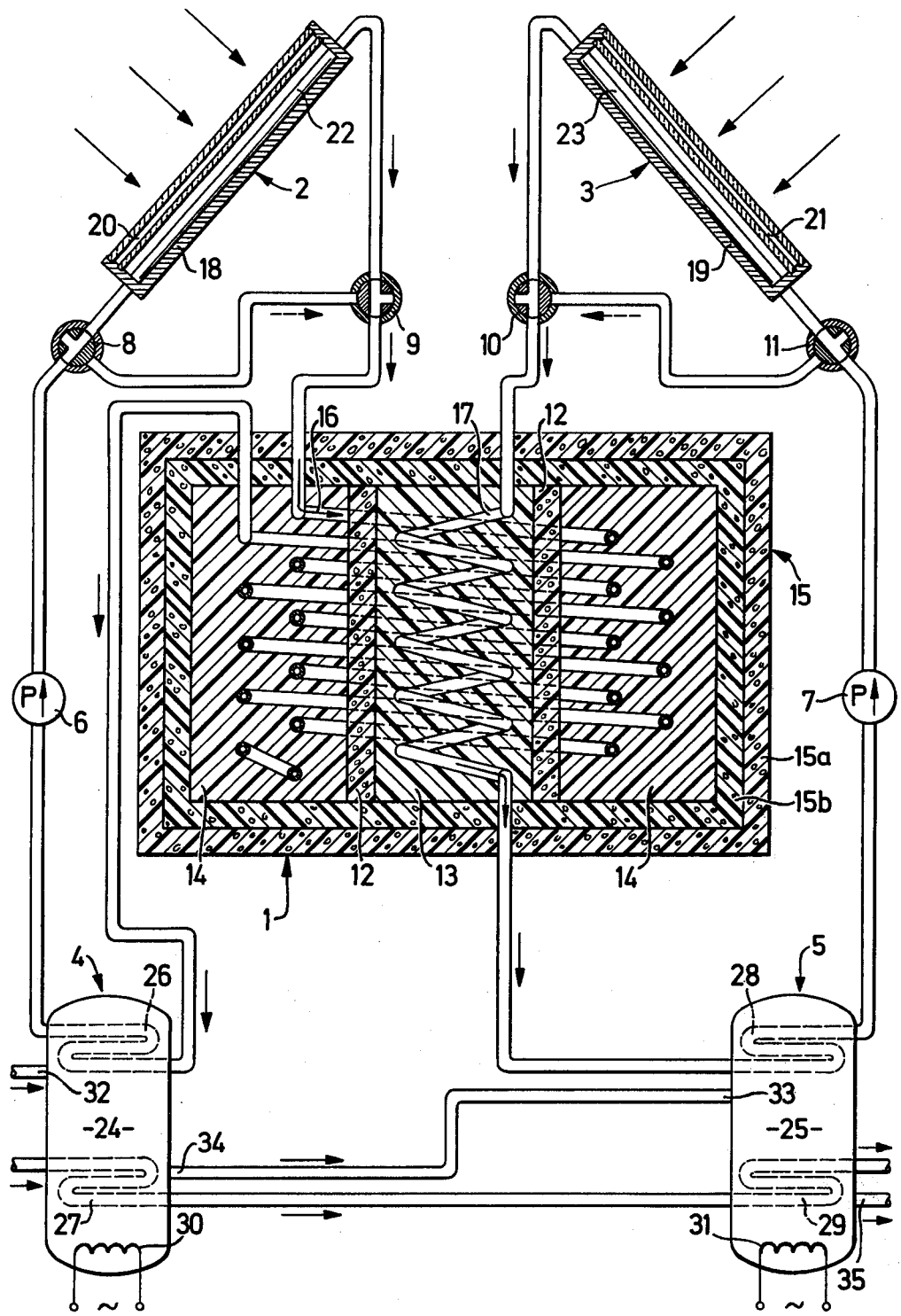

HEAT STORE AND INSTALLATION FOR THE UTILIZATION OF SOLAR ENERGY

This is a continuation of application Ser. No. 680,303, filed on Apr. 26, 1976, now abandoned.

The invention relates to a heat accumulator which has a heat exchanger which is embedded in a crystalline substance and has a maximum operating temperature greater than the melting point of the crystalline substance, and to a use thereof.

Known installations for the storage of solar energy, waste heat, such as waste steam energy and off-gas, energy and the like generally consist of a collector, which collects the heat to be stored, a system of pipelines, which contains heat transfer liquids, and the actual heat store. In most cases, the latter contains a salt mixture or salt solution as the storage material.

When salt solutions and salt melts are used in heat accumulators, there are frequently severe corrosion problems. For this reason, corrosion-resistant metal containers are in the main required to contain the salts, but these containers are heavy and conduct heat well. Both properties are disadvantageous, quite apart from the fact that such containers make the total installation expensive. Furthermore, fractures and leaks of the salt containers and pipes must always be expected and this results in the extremely undesirable exudation of the solutions or melts.

The continuous change in the state of aggregation from solid to liquid and vice versa places a particular stress on the containers. As is known, every time salts remelt thermal stresses arise, which lead to bulging of the salt container. The volume of the bulge is completely filled by the salt melt. After the melt has solidified, the precondition for the next bulging then exists. Stress of this type in particular very rapidly leads to the installation developing leaks, as feared.

Accordingly, the object of the invention is to provide a heat accumulator which does not have the defects of known accumulators, which have been mentioned. According to the invention, this object is achieved by integrating the crystalline substance and the heat exchanger in a moulding which is bonded by means of crosslinked plastic. According to a preferred embodiment, the crosslinked plastic is itself crystalline and, at the same time, forms the crystalline substance. In the present document and in accordance with the present invention, a crystalline plastic or synthetic resin is to be understood as a product which is usually partially crystalline. The preferred embodiment at the same time avoids a further considerable disadvantage of the known heat accumulators, that is to say the fact that it is not always possible, with the known salt-containing storage media, even when different salts are mixed, to obtain the particular melting point which is optimum for the intended application. A virtually free choice of the melting point of the storage substance is of fundamental importance, particularly for the storage of solar energy. Depending on the position and construction of the heating system it must be possible, for optimum utilisation, to employ storage substances which have different melting points. However, this is not ensured in the case of salts and salt mixtures. If a salt mixture which does not correspond to a eutectic composition is chosen, demixing phenomena always occur when the melt solidifies. Only purely eutectic mixtures crystallise in a constant composition. However, eutectic melts have a great tendency to supercooling and must therefore be seeded. This, in turn, however, has the consequence that here again demixing phenomena gradually manifest themselves. It is not possible to realise every desired melting point by choosing eutectic salt mixtures, if only because the number of eutectics is limited. Furthermore, some eutectic melting points can only be obtained by choosing expensive salts, which a priori precludes the practical realisation of such eutectics.

In comparison with salts, the crystalline, crosslinked plastic contained in the heat accumulator according to the invention exhibits the peculiarity, and the advantage, that no change in the state of aggregation (that is to say from "solid" to "liquid" and vice versa) occurs when it is charged with heat energy and when this energy is discharged. It is true that the crystallites contained in the plastic melt in the region of the crystallite melting point. However, the solid state, and thus the given shape, remains preserved. At the same time, in most cases the plastic turns transparent and there may be a transition to the rubbery-elastic state, with simultaneous absorption of the heat of fusion. By suitable choice of the basic components — preferably polyesters and their acids — and of the crosslinking system (epoxide compounds, density of crosslinking) used for the manufacture of the crosslinked crystalline plastic it is possible, above all in the temperature range of about 30°–70° C, which is of most interest in practice, to obtain virtually any desired crystallite melting point and thus to suit the heat-storing substance in an optimum manner to its intended use.

The invention is explained in more detail below with the aid of an illustrative embodiment shown in the drawing. The single FIGURE in the drawing shows a section through a heat accumulator according to the invention in use in an installation for the utilisation of solar energy.

The two-stage installation for the utilisation of solar energy which is shown comprises, as the central part, a heat accumulator 1 and also, in addition, two solar energy absorbers 2 and 3, two useful-heat exchangers 4 and 5, two circulating pumps 6 and 7 and a pipe system which is provided with valves 8 to 11 and which joins the parts mentioned, in a manner which is yet to be described, to two separate heat transfer liquid circuits.

The heat accumulator 1 comprises two concentric blocks 13 and 14, which consist of a crosslinked crystalline plastic which will be specified in more detail below and are separated by an insulating layer 12, and is provided with an all-round heat insulating foam jacket 15. The crystallite melting point of the outer block 14 is set at 45° C and that of the inner block 13 is set at 60° C. The foam jacket is designed in two layers, the outer layer 15a consisting of rigid foam and the inner layer 15 consisting of soft elastic plastic foam. The insulating layer 12 also consists of a soft elastic foam. By this means changes in volume which arise on warming and cooling are evened out.

A heat exchanger, in the form of copper tube coils 16 and 17 respectively, is embedded in each of the plastic blocks 13 and 14, which form the storage media, the heat exchanger forming an integral body with the particular plastic block. Of course, virtually any other type of heat exchanger is also suitable, in place of copper tube coils. In particular, for reasons of insulation, it is appropriate to use those heat exchangers in which the heat transfer medium in the course of its passage flows through the heat exchanger from the peripheral zones to the central zones or vice versa. As is shown in the drawing, a heat exchanger of this type can be realised, for example, by two or more communicating coaxial tube coils. The coils can, for example, also be provided with fins, which increase the surface area, or the like.

In order to keep the heat losses due to radiation and the like as small as possible, the heat accumulator 1 has a cylindrical shape. As is known, this geometric shape represents a favourable compromise between the demand for a surface to volume ratio which is as small as possible and shaping which meets the requirements in practice. Of course, other geometric shapes are also suitable and possible.

In contrast to the heat accumulator 1, the solar energy absorbers 2 and 3, only a section of which is shown in the drawing, are designed with a large surface area. They are of a construction which is in itself known and each consists of a flat heat exchanger, 22 and 23 respectively, which is arranged in a casing, 18 and 19 respectively, with double glazing, 20 and 21 respectively. The surface area of the two absorbers together is approximately 30 m².

The two useful-heat exchangers 4 and 5 each consist of a heat-insulated kettle, 24 and 25 respectively, and in each kettle two coils 26 and 27 and, respectively, 28 and 29 and an electric heater, 30 and 31 respectively, are located.

Each kettle also has an inlet, 32 and 33 respectively, and an outlet, 34 and 35 respectively. The two kettles 24 and 25 are connected in series. They are, for example, in an installation, which is not shown, for the production of warm water, in which case cold water passes through the inlet 32 into the kettle 24 and warm water can be removed from the kettle 25 through its outlet 35.

The two heat exchange coils 27 and 29 are also connected in series. They form part of the circuit of a heating installation, which is not shown, for warm water and serve to heat the heating water.

As can be seen from the drawing, two separate circuits are provided for the heat transfer medium, which in this case also is water. One circuit comprises the heat exchanger 16, which is embedded in the outer block 14 of the heat accumulator 1, the solar energy absorber and collector 2, the circulating pump 6 and the exchanger coil 26, which is located in the useful-heat exchanger 4, and the three-way valves 8 and 9, which are located in the pipes, which are not shown. The second circuit comprises the heat exchanger 17 of the inner heat storage block 13, the solar energy absorber 3, the circulating pump 7 and the exchanger coil 28 in the useful-heat exchanger 5, as well as the two three-way valves 10 and 11.

In order to store the solar energy absorbed by the absorbers and collectors 2 and 3, the valves 8 to 11 are brought into the position shown and the circulating pumps are switched on. The heat transfer media warmed in the collectors now flow through the particular heat exchangers in the storage blocks 13 and 14 and through the useful-heat exchangers 4 and 5. In this way, on the one hand, the storage blocks 13 and 14 are charged and, on the other hand, the useful water in the kettles 24 and 25, and thus also indirectly the useful water in the heat exchanger coils 27 and 29, is warmed. The useful-heat exchanger 4 has the function of a pre-heater. The temperature reached in this pre-heater is about 35° C. The useful-heat exchanger 5 heats the useful water, pre-warmed in this way, to a temperature of about 50° C, ready for use. This two-stage system permits optimum utilisation of the solar energy.

In order to discharge the heat accumulator, the three-way valves 8–11 are brought into a position which bridges the solar energy collectors and excludes these from the cycles. The useful water is thus heated, with extremely small losses, by means of the heat contained in the accumulator 1.

In periods in which the solar irradiation is weaker, or is not adequate for complete charging of the heat accumulator, the lacking amount of heat is supplied by the electric heaters provided in the useful-heat exchangers. A mixed operation, in which, for example, charging of the accumulator is effected via solar energy in one circuit and via electrical energy in the other circuit, is also possible.

Of course, the shown assembly of the individual parts of the installation for the utilisation of solar energy is not the only possible assembly. For example, it can also be advantageous, for certain purposes, to provide even further stages and/or to connect several stages in series instead of in parallel. Of course, a single stage can also be adequate for some purposes.

It is, furthermore, also possible to design the heat accumulator itself as a solar energy collector. Of course, it is then necessary to choose a geometric shape which has as large a surface area as possible, coupled with a small volume.

It is evident that the heat accumulator according to the invention cannot only be employed on earth but, in particular because of the absence of a liquid phase, is also fully capable of functioning in a vacuum, that is to say, for example, in space, and is therefore particularly suitable for such applications.

The crystalline crosslinked plastic of the heat accumulator according to the invention is preferably a casting resin of a type which permits the manufacture of mouldings having a large volume.

Of course, it is not absolutely necessary for the heat-storing material in the heat store according to the invention to be a crystalline, crosslinked plastic. For example, it could also consist of a foam of crosslinked plastic having closed cells which enclose a suitable storage medium. Furthermore, it is also possible to fill crystalline substances, such as, for example, paraffin, palmitic acid, lauric acid and the like, into suitable containers of small volume and to pot these by means of a casting resin, preferably of a crystalline, crosslinked polymer of the types indicated further above, and thus to form an integral body together with the embedded heat exchanger.

Several plastics, which are particularly suitable as a heat-storing substance, and the manufacture thereof are discussed in more detail in the text which follows.

The heat accumulator according to the invention preferably contains, as the crystalline, crosslinked plastic, an epoxide resin or polyurethane resin or polyester resin or a mixture of these synthetic resins which all contain, as crystallite-forming blocks, radicals of long-chain dicarboxylic acids or dialcohols of the formula I $$X^1 - A - X^2 \qquad (I)$$

in which $X^1$ and $X^2$ each represent a —CO.O— group or a —O— group and in which A denotes a substantially linear radical, in which polymethylene chains alternate regularly with ether oxygen atoms or carboxylic acid ester groups, and the quotient Z/Q, wherein Z is the number of $CH_2$ groups present in the recurring structural element of the radical A and Q is the number of oxygen bridges present in the recurring structural element of the radical A, must be at least 3 and preferably at least 5 or 6 and wherein, furthermore, the total number of the carbon atoms present in the radical A in alternating carbon chains is at least 30.

Epoxide resins of this type which all contain radicals of long-chain dicarboxylic acids of the formula I are described, for example, in a publication by Hans Batzer et al. in "Die angewandte makromolekulare Chemie" 29/30 (1973), on page 349 to 412.

Such special epoxide resins also include, in particular, crystalline, crosslinked epoxide resins (L), which are manufactured by reaction of epoxide compounds, containing two or more epoxide groups.

a. with polyester-polycarboxylic acids A, which essentially contain segments of the formula IV

$$-[O-(CH_2)_n-O.CO-(CH_2)_m-CO]_p- \qquad (IV)$$

in which n and m are identical or different and denote 2 or a higher number than 2, and to which the condition $n + m = 6$ to 30 applies, and in which p denotes a number from 2 to 40, which, however, is sufficiently large that the segment contains at least 30 $-CH_2-$ groups, and b. with polyester-polycarboxylic acids B which essentially contain segments of the formula V

$$-[O-R^1-O.CO-R^2-CO]_q \qquad (V)$$

in which $R^1$ and $R^2$ are identical or different and denote an alkylene radical with at least 2 C atoms in the chain and in which, per O bridge, an average of at least 3.5 and at most 30 C atoms, without taking into account the C atoms of the $-CO.O-$ radicals, are present in the chain, and wherein the radicals $R^1$ and $R^2$ together contain at least one alkyl group or cycloalkyl group or one aryl group as a substituent for one H atom or one ring-forming, optionally substituted alkylene group as a substituent for 2 H atoms of a chain, and in which q denotes a number from 2 to 40, which, however, is sufficiently large that the segment contains at least 30 C atoms, without taking into account the C atoms of the $-CO.O-$ radicals, in the chain, and c. if appropriate, with curing agents C, and, if appropriate, in the presence of accelerators, in a ratio such that 0.5 to 1.2 equivalents of polyester-polycarboxylic acid are present per equivalent of epoxide compound, that 5/10 to 9/10 of these 0.5 to 1.2 equivalents are attributable to the polyester-polycarboxylic acid A and the remaining 5/10 to 1/10 to the polyester-polycarboxylic acid B, and that up to 0.6 equivalent of curing agent C is present per equivalent of epoxide compound, with the proviso that, in the cases in which only difunctional epoxide compounds and difunctional polyester-polycarboxylic acids A and B are employed, the epoxide groups must be present in excess and the reaction with a curing agent C is essential. Preferably, the condition $n + m = 6$ to 24 applies to the formula IV.

Preferably, the procedure followed for the manufacture of the epoxide resins (L) is such that 0.7 to 1.2, especially 0.9 to 1.1, equivalents of polyester-polycarboxylic acid are present per equivalent of epoxide compound.

The polyester-polycarboxylic acids A and B used in the reaction can, for practical purposes, be manufactured by the same basic process, by esterification of corresponding aliphatic dialcohols and aliphatic dicarboxylic acids or by forming esters of suitable derivatives of these alcohols and dicarboxylic acids, such as, for example, the anhydrides, acid chlorides and the like. The dicarboxylic acids must be present in excess.

Where small amounts of aliphatic polyalcohols with at least 3 OH groups, especially glycerol, are also used, branched, that is to say at least 3-functional, polyester-polycarboxylic acids A and B are obtained.

Branched polyester-polycarboxylic acids A and B, which are obtained if small amounts of polycarboxylic acids, or their anhydrides, with at least 3 carboxyl groups (such as, for example, trimellitic acid) are also present during the manufacture of the polyester-polycarboxylic acids, are equally suitable for the manufacture of the epoxide resins (L).

However, it is also possible to employ branched polyester-polycarboxylic acids A and B, which are obtainable by esterification of the terminal OH groups of long-chain polyester-polyols, especially of polyester-diols, with polycarboxylic acids which contain at least 3 $-CO.OH$ groups, such as, for example, trimellitic acid, or with corresponding anhydrides.

The basic rules for the manufacture of the polyester-polycarboxylic acids A and B used as starting substances for the epoxide resins (L) in other respects entirely correspond to those which have to be observed for the manufacture of the "long-chain dicarboxylic acids" employed according to British Pat. No. 1,164,584, and which are described in detail in this British patent. Further data on the basic principles of the manufacture of such long-chain, aliphatic polyester-polycarboxylic acids are also to be found in a publication by Hans Batzer et al. in "Die Angewandte Makromolekulare Chemie" 1973, page 349–412.

Examples of suitable polyester-polycarboxylic acids A are those based on the following polyalcohols and polycarboxylic acids:

16 mols of adipic acid — 15 mols of hexane-1,6-diol
21 mols of succinic acid — 20 mols of butane-1,4-diol
11 mols of sebacic acid — 10 mols of hexane-1,6-diol
Glycerol - succinic acid — butanediol (1:24:21)
11 mols of succinic acid — 10 mols of butanediol
11 mols of dodecanedicarboxylic acid — 10 mols of hexanediol
11 mols of dodecanedicarboxylic acid — 10 mols of butanediol
11 mols of dodecanedicarboxylic acid — 10 mols of propane-1,3-diol
7 mols of dodecanedicarboxylic acid — 6 mols of hexanediol
7 mols of dodecanedicarboxylic acid —6 mols of dodecanediol
7 mols of sebacic acid — 6 mols of dodecanediol
11 mols of sebacic acid — 6 mols of dodecanediol
Trimethylhexanediol — succinic anhydride — butanediol (1:30:27)
11 mols of dodecanedicarboxylic acid — 10 mols of ethylene glycol
5 mols of decanedicarboxylic acid — 4 mols of dodecanediol
11 mols of decanedicarboxylic acid — 10 mols of hexanediol Examples of suitable polyester-polycarboxylic acids B are those based on the following polyalcohols and polycarboxylic acids:

11 mols of sebacic acid — 10 mols of neopentylglycol
8 mols of adipic acid — 7 mols of neopentylglycol
13 mols of adipic acid — 12 mols of neopentylglycol
8 mols of adipic acid — 7 mols of trimethylhexanediol
8 mols of trimethyladipic acid — 7 mols of neopentylglycol
14 mols of adipic acid — 13 mols of neopentylglycol
4 mols of dimerised fatty acid — 3 mols of diethylene glycol
4 mols of dimerised fatty acid — 3 mols of hexanediol
3 mols of dimerised fatty acid — 2 mols of hexanediol
Glycerol — adipic acid — butanediol — neopentylglycol (1:9:3:3)
Trimethylhexanediol — adipic acid — hexanediol — neopentylglycol (1:8:2:3)
14 mols of succinic acid — 13 mols of neopentylglycol
4 mols of hexahydrophthalic anhydride — 3 mols of neopentylglycol.

With regard to the aliphatic polyester-polycarboxylic acids described, it must also be stated that the same or similar compounds are also the basic structural units of the abovementioned more general epoxide resins and polyurethane resins and polyester resins whicch contain radicals of the formula I. General epoxide resins of this type are also manufactured by analogous processes, the only difference being that only one polyester-polycarboxylic acid is employed in each case.

As epoxide compounds containing two or more epoxide groups it is possible to employ virtually all the polyepoxy compounds known, to those skilled in the art, from publications and patent specifications. One or more different epoxide compounds can be reacted. Triglycidyl isocyanurate and triglycidyl compounds which contain one or more hydantoin groups and/or dihydrouracil groups, especially epoxide compounds of the formula III

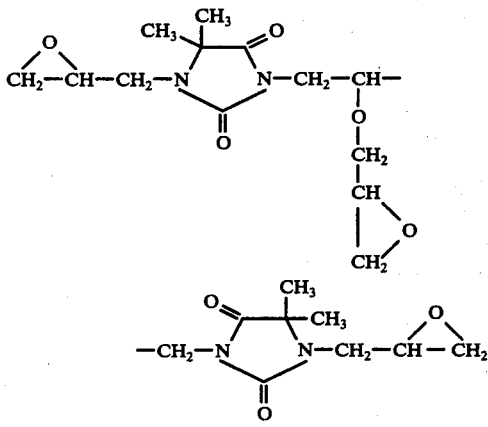

are particularly suitable.

In principle, the reaction for the manufacture of the epoxide resins (L) can be carried out either in 1 stage or in several stages. If the epoxide compounds used have at least 3 epoxide groups, and polyester-dicarboxylic acids A and B are employed, it is possible, for example, to carry out the reaction in 1 stage, that is to say to start from a reaction mixture which contains all the reactants simultaneously. It is possible to proceed in exactly the same way (that is to say in 1 stage) if, instead of the dicarboxylic acids, polyester-polycarboxylic acids A and B which have at least 3 carboxyl groups are employed. In the converse case, that is to say when using polyester-carboxylic acids A and B containing at least 3 carboxyl groups, and using diepoxy compounds, working in 1 stage is again possible and is the normal method of reaction for such cases.

If only diepoxy compounds and only polyester-dicarboxylic acids are employed, it is only possible to work in one stage if an excess of epoxide compounds is used and at the same time a polycarboxylic acid anhydride is added.

In the multi-stage method, an adduct containing epoxide groups is initially manufactured, in a first stage, from the epoxide compounds and the polyester-polycarboxylic acids A and/or B, preferably using 0.5 to 1 equivalent of polyester-polycarboxylic acid per 2 equivalents of epoxide compounds. In a second reaction stage, the crosslinking is then carried out, by reaction of the adducts with the remainder of the polyester-polycarboxylic acids A and/or B. It is also possible to proceed by carrying out the crosslinking in the second stage in the presence of customary curing agents. It is also possible additionally to add yet further monomeric epoxide compounds and correspondingly larger amounts of curing agents.

As customary curing agents for epoxide resins it is possible to employ all the substances which are described in the numerous publications and patents relating to epoxide resins. Inter alia, the following substances may be listed here: compounds with amino groups, polyalcohols, polycarboxylic acids and their anhydrides, acid amides, polyesters, phenol-formaldehyde condensates and amino-resin precondensates. Tertiary amines and imidazoles may be mentioned as examples of suitable accelerators.

The statements made above with regard to the single stage and multi-stage procedure for the manufacture of the epoxide resins (L) analogously also apply quite generally to the manufacture of epoxide resins in a wider sense, which resins all contain, as crystallite-forming blocks, radicals of long-chain dicarboxylic acids or dialcohols of the formula I. Furthermore, the following applies to the manufacture of epoxide resins in general:

The reaction is preferably carried out in the melt. For this, preferably temperatures of between 50° and 200° C and reaction times of more than 1 hour and up to about 20 hours are required. In principle, the reaction can also be carried out in solution.

Of course, the plastics can contain further customary additives, such as fillers, reinforcing agents, mould-release agents, agents to protect against aging, flame-proofing substances, dyestuffs or pigments.

Suitable fillers or reinforcing agents are fibrous or pulverulent inorganic or organic substances. Quartz powder, aluminium oxide trihydrate, mica, aluminium powder, iron oxide, ground dolomite, chalk powder, gypsum, slate powder, unburnt kaolin (bolus), burnt kaolin, glass fibres, boron fibres and asbestos fibres may be mentioned. A content of materials, in the form of fibres and powders, which assist the heat conductivity can also prove particularly advantageous. Examples of such materials are metals (for example aluminium powder), carbon, such as carbon black and graphite in powder form, and carbon fibres.

For the purpose of optimum and accelerated development of the crystal structure of the polymers it is also appropriate to add nucleating agents, such as phthalocyanines, carbon black or the like.

EXAMPLE 1

880 g (0.567 equivalent) of an acid polyester consisting of 11 mols of sebacic acid and 10 mols of hexanediol (prepared by the melt process) were warmed to 100° C and mixed well with 94.6 g (0.567 equivalent) of the triglycidyl compound of the formula III and the system was evacuated and the mixture poured into an Anticorodal mould which had dimensions of 200 × 200 × 24 mm, had been pre-warmed to 120° C and had been treated with a silicone mould-release agent. A copper tube which was about 130 cm long, onto which copper fins had been soldered and which was bent to and fro 5 times in a meandering manner, was located in the casting mould. The internal width of the tube was 4 mm and the wall thickness was 6 mm. The tube runs in the spiral had a height of 17 cm and a spacing of 2.5 cm each.

The epoxide resin system was warmed to 140° C and 16 hours. A crystalline, tough storage system was obtained. The epoxide resin had a crystallite melting point of 62° C and an enthalpy of melting of 20 cal/g. The epoxide resin was rubbery-elastic above the melting point.

One surface of the accumulator was coloured black and, with a glass insulation, was mounted as a collector and exposed to the sun. After an exposure time of 5 hours, the centre of the collector had warmed to 72° C. It was completely rubbery-elastic and thus had absorbed (stored) the heat of fusion as well as the specific heat. This means that energy of about 1,000 kcal/m$^2$ had been absorbed by the collector over a period of 5 hours. The experiment was carried out in Basel on 21.2.1975.

EXAMPLE 2

A further heat accumulator with dimensions of 200 × 200 × 48 mm was cast analogously to Example 1.

The accumulator was insulated with polystyrene foam 10 cm thick and warmed with warm water at 65° C. After 5 hours the crystalline polymer was completely "melted", that is to say it was in a rubbery-elastic state, a temperature of 63° C being recorded in the centre of the panel and on the surface.

Water at 22° was passed through the accumulator warmed to 63° C. It was possible to warm 2.7 L of water to 40° C. The experiment shows that, of the 34 kcal heat of crystallisation and the 20 kcal for the specific heat, about 48 kcal could be recovered.

EXAMPLE 3

A collector according to the state of the art (200 × 600 mm sheet copper painted black) was connected to an accumulator according to Example 1. After exposure to the sun for 4 hours, a temperature of 74° C was measured in the storage panel. Thus, it was possible to charge the accumulator by solar energy by means of the collector which was present, that is to say to convert the accumulator into the rubbery-elastic state.

The experiment was carried out on 27.2.1975 in Basel (sunny weather but somewhat hazy).

EXAMPLE 4

An accumulator with dimensions of 200 × 200 × 54 mm was manufactured analogously to Example 1 but in place of the sebacic acid polyester a polyester obtained from 11 mols of adipic acid and 10 mols of hexanediol was used. The accumulator was warmed analogously to Example 3. After exposure to the sun for 4 hours, the accumulator reached a temperature of 51° C (initial temperature = 31° C). It could be charged in this way, that is to say converted into the rubbery-elastic state.

The experiment was carried out on 26.2.1975 in Basel (sunny but very hazy).

EXAMPLE 5

24.85 kg of a polyester obtained from 11 mols of adipic acid and 10 mols of hexanediol (prepared by the melt process) with an acid equivalent weight of 1,130 were melted and warmed to 140° C. 3.67 kg of the triepoxide compound of the formula III and 330 g of phthalocyanine blue were admixed to the melt. After adding 36.7 g of dimethylaminobenzylamine, the system was again mixed well and the mixture was poured into a cylindrical, slightly conical cylinder 30 cm in diameter and 38 cm in height. A copper spiral (external diameter = 6 mm, internal diameter = 4 mm) was laid in the still liquid warm mixture, the tubes being laid down with spacings of 2 5–3 cm. After curing at 140° C for 16 hours, a moulding was obtained which was rubbery-elastic when hot and which, without additional insulation, started to crystallise at the edge at 40° C only after 24 hours. For about 10 hours the temperature at a distance of about 2 cm from the edge remained at 40°–41° C. Inside the moulding, the temperature remained above 35° C for a considerably longer period (40 hours).

The experiment shows that, even with relatively modest insulation, it is possible, particularly in the case of relatively large mouldings, to store the heat for more than 2 days, the outer layer of the store serving as an additional insulation.

EXAMPLE 6

A moulding was manufactured in the same way using an 11:10 sebacic acid — hexanediol polyester in place of the adipic acid — hexanediol polyester, 1.0 equivalent of the epoxide resin used in Example 5 being used per 1.0 equivalent of polyester. The moulding was manufactured without the addition of phthalocyanine blue and exhibited a crystallisation temperature of 48°–49° C.

EXAMPLE 7

23.2 kg of an acid polyester obtained from 11 mols of dodecanedioic acid and 10 mols of hexanediol (acid equivalent weight = 1,643) and 1.13 kg of an acid polyester obtained from 8 mols of adipic acid and 7 mols of neopentylglycol (equivalent weight = 700) are warmed to 110° C and mixed well with 2.61 kg of the heterocyclic triepoxide compound III (equivalent weight = 167) (equivalent ratio = 0.9:1.0:1.0) and 270 g of α-naphthoic acid, as the nucleating agent, and 70 g of 1-methylimidazole, as the accelerator, the system is evacuated and the mixture is poured into a mould, analogously to Example 5. After curing for 24 hours at 130° C, a moulding is obtained which is rubbery-elastic when hot and which changed into the partially crystalline state at room temperature, with the release of heat. After release from the mould, the moulding is insulated by means of 20 cm of polystyrene foam (cork base panel) and warmed to 80° by means of the copper spiral (1.88 kg of copper tube per 27.0 kg of resin). On cooling, the temperature at the centre of the moulding is 64° C after 15 hours and still 61° C after 44 hours. The temperature of an equally large container filled with water is 60° after 10 hours and only 50° C after 15 hours. Thus, considerably better storage of the energy is made possible by the crystalline, crosslinked plastic. Crystallite melting point = 68° C Enthalpy of melting = 19.2 cal/g

EXAMPLE 8

Using the same resin mixture as in Example 7 an identical moulding is cast but this, however, in addition to the copper spirals, additionally contains 6.2 kg of paraffin, filled into tubes 3.5 cm in diameter. On cooling, this moulding has a temperature of 66° C after 10 hours and a temperature of 61° C after 30 hours. This moulding with the potted paraffin thus also displays good storage of heat.

EXAMPLE 9

63 kg of the following mixture: 1.0 equivalent of a polyester obtained from 11 mols of adipic acid and 10 mols of hexanediol (equivalent weight = 1,080), 1.0 equivalent of the heterocyclic triepoxide compound III (equivalent weight = 167), 3% by weight of finely powdered urea-formaldehyde resin, 1% by weight of melamine, 0.1% by weight of β-Cu phthalocyanine (blue) and 0.3% by weight of 1-methylimidazole, which had been evacuated at 110° C, were cast in a rectangular mould which had a base area of 17 × 100 cm and contained a copper spiral with an internal diameter of 3 mm and an external diameter of 10 mm (a total of 5 kg of copper). The mixture is cured over the copper spiral at 120° C (about 40 hours) and, after cooling, is released from the mould. After insulating with 20 cm of polystyrene foam, the moulding is warmed to 80°. On cooling the following curve is obtained for the fall in temperature:

after 70 hours: 48° C
after 160 hours: 44° C

The crystallites of the epoxide resin crystallise out at 44°–48° and are able to maintain the temperature at this level for a surprisingly long period of time. Despite the relatively small thickness of the mouldings, these already exhibit a good storage effect.

EXAMPLE 10

1,324 g = 0.7 equivalent of an acid polyester obtained from 10 mols of dodecanedioic acid and 9 mols of dodecanediol with an equivalent weight of 1,892 are warmed to 110° C and mixed well with 117 g = 0.7 equivalent of the heterocyclic epoxide resin III and 4 g of 1-methylimidazole, the system is evacuated and the mixture is poured into a 1.5 l glass beaker which contains a copper spiral. After curing for 16 hours at 130° C, a white moulding which is rubbery-elastic when warm and crystalline at room temperature is obtained. The moulding is warmed to 100° C and, when insulated with 10 cm of polystyrene, is cooled. The temperature in the centre is 73° C after 2 hours and 71° C after 4 hours and thereafter falls more rapidly again at a rate of 3°–4°/hour. In the range between 71° and 73° C, the moulding gives an enthalpy of crystallisation of 23 cal/g.

EXAMPLE 11

1.0 equivalent of a polyester obtained from 10 mols of sebacic acid and 11 mols of hexane-1,6-diol is reacted hot (70° C) with 1.2 mols of toluylene 2,4-diisocyanate, with exclusion of moisture and in a nitrogen atmosphere. The adduct has an isocyanate equivalent weight of 862 (theory 868).

862 g = 1.0 equivalent of the resulting adduct are warmed to 80° C and mixed with 44.6 g (= 1.0 equivalent) of hexanetriol, the system is evacuated and the mixture is poured into a glass beaker which contains a copper spiral. After curing for 2 hours at 70° C, for 2 hours at 120° C and for 2 hours at 140° C, a moulding which is rubbery-elastic when hot and white and crystalline at room temperature is obtained: crystallite melting point = 51° C enthalpy of melting = 16 cal/g The accumulator is warmed to 100° C and left to cool in an insulation of 10 cm thick polystyrene foam. As a result of the crystallisation of the crosslinked polymer, cooling is retarded in the temperature range between 45° and 35° C.

EXAMPLE 12

1.0 equivalent of the polyester described in Example 11 (OH equivalent weight = 1,006) is reacted, at 150° C, with 1 mol of maleic anhydride, a polyester with terminal carboxylic acids and double bonds resulting (equivalent weight = 1,070). 70 g of the resulting polyester are mixed, at 70° C, with 30 g of styrene and 2 g of 50% strength benzoyl peroxide and, after evacuating the system, the mixture is poured into a tube 3.5 cm in diameter. After curing for 2 hours at 70° C, for 2 hours at 120° C and for 2 hours at 140° C, a moulding is obtained, which is rubbery-elastic when hot and changes into the crystalline state on cooling.

Crystallite melting point = 33° C
Enthalpy of melting = 8 cal/g

We claim:

1. Heat accumulator which has a heat exchanger which is embedded in a crystalline substance and has a maximum operating temperature greater than the melting point of the crystalline substance, the crystalline substance being a crosslinked plastic and forming a moulding wherein the heat exchanger is integrated.

2. Heat accumulator according to claim 1, wherein the moulding contains flameproofing fillers, for example aluminium oxide trihydrate, antimony oxide or the like, and/or nucleating agents, for example phthalocyanines, and/or carbon black, and/or substances which assist the best conductivity, such as aluminium and graphite.

3. Heat accumulator according to claim 1, wherein the moulding is reinforced by fiber mats or fabrics, especially made of glass, asbestos or the like.

4. Heat accumulator according to claim 1, wherein the moulding contains at least two crystalline zones with different melting points.

5. Heat accumulator according to claim 4, wherein at least one of the zones contains a heat exchanger with separate connections.

6. Heat accumulator according to claim 4, wherein at least some of the heat exchangers integrated in the individual zones are connected in series.

7. Heat accumulator according to claim 1, wherein the moulding is surrounded by a jacket of heat-insulating insulating material, this jacket preferably forming an integral part of the moulding and consisting of at least two layers of foam, the innermost of which is soft elastic.

8. Heat accumulator according to claim 4, wherein at least two of the zones are insulated from one another by a heat-insulating layer.

9. Heat accumulator according to claim 8, wherein the insulating layer forms an integral part of the moulding and preferably consists of a soft elastic foam, especially a foamed plastic.

10. Heat accumulator according to claim 1, wherein the moulding has a surface area which is small in comparison with its volume and is, in particular, spherical or cylindrical.

11. Heat accumulator according to claim 4, wherein the zones are arranged concentrically to one another.

12. Heat accumulator according to claim 11, wherein the inner zones have a higher melting point than the outer zones.

13. Heat accumulator according to claim 1, wherein the moulding has a surface area which absorbs heat, especially radiant heat, which is large in comparison with its volume.

14. Heat accumulator according to claim 13, wherein a region of the surface area is designed as a solar energy absorber.

15. Heat accumulator according to claim 1, wherein the melting point of the crystalline substance or substances is the range of about 30°–70° C.

16. Heat accumulator according to claim 4, wherein one zone has a melting point in the range of about 30°–50° C and another zone has a melting point in the range of about 40°–70° C.

17. Heat accumulator according to claim 1, wherein the crystalline substance is an epoxide resin or polyurethane resin or polyester resin or a mixture of these synthetic resins which all contain, as crystallite-forming blocks, radicals of long-chain dicarboxylic acids or dialcohols of the formula I $$X^1 - A - X^2 \quad (I)$$

in which $X^1$ and $X^2$ each represent a —CO.O— group or a —O— group and in which A denotes a substantially linear radical, in which polymethylene chains alternate regularly with ether oxygen atoms or carboxylic acid ester groups, and the quotient Z/Q, wherein Z is the number of $CH_2$ groups present in the recurring structural element of the radical A and Q is the number of oxygen bridges present in the recurring structural element of the radical A, must be at least 3 and preferably at least 5 or 6 and wherein, furthermore, the total number of the carbon atoms present in the radical A in alternating carbon chains is at least 30.

18. Heat accumulator according to claim 17, characterised in that the crystalline substance is an epoxide resin which is obtained by reacting polyester-dicarboxylic acids with polyepoxide compounds having at least 3 epoxide groups, about 1 equivalent of polycarboxylic acid being present per equivalent of epoxide compound.

19. Heat accumulator according to claim 17, characterised in that the crystalline substance is an epoxide resin which is obtained by reacting polyester-polycarboxylic acids having at least 3 carboxyl groups with epoxide compounds having at least 2 epoxide groups, about 1 equivalent of polyestercarboxylic acid being present per equivalent of epoxide compound.

20. Heat accumulator according to claim 17, characterised in that the crystalline substance is an epoxide resin which is obtained by reacting diepoxide compounds with polyester-dicarboxylic acids and with dicarboxylic acid anhydrides in an equivalent ratio of 1:0.4 to 0.9:0.1 to 0.6.

21. Heat accumulator according to claim 17, characterised in that the crystalline substance is an epoxide resin which is obtained by reacting polyester-polycarboxylic acids with epoxide compounds from the group comprising triglycidyl isocyanurate and triglycidyl compounds which contain one or more hydantoin groups and/or dihydrouracil groups, especially with the epoxide compound of the formula III

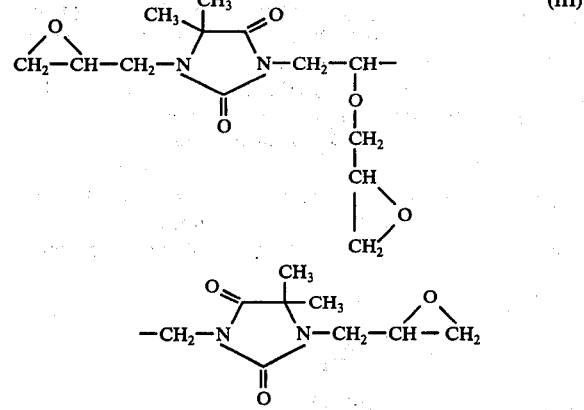

22. Heat accumulator according to claim 17, characterised in that the crystalline substance is a crosslinked, elastomeric epoxide resin (L), which is manufactured by reaction of epoxide compounds, containing two or more epoxide groups,
 a. with polyester-polycarboxylic acids A, which essentially contain segments of the formula IV $$-[O-(CH_2)_n-O.CO-(CH_2)_m-CO]_p- \quad (IV)$$

in which $n$ and $m$ are identical or different and denote 2 or a higher number than 2, and to which the condition $n + m = 6$ to 30 applies, and in which $p$ denotes a number from 2 to 40, which, however, is sufficiently large that the segment contains at least 30 —$CH_2$— groups, and
 b. with polyester-polycarboxylic acids B which essentially contain segments of the formula V $$-[O-R^1-O.CO-R^2-CO]_q \quad (V)$$

in which $R^1$ and $R^2$ are identical or different and denote an alkylene radical with at least 2 C atoms in the chain and in which, per O bridge, an average of at least 3.5 and at most 30 C atoms, without taking into account the C atoms of the —CO.O— radicals, are present in the chain, and wherein the radicals $R^1$ and $R^2$ together contain at least one alkyl group or cycloalkyl group or one aryl group as a substituent for one H atom or one ring-forming, optionally substituted alkylene group as a substituent for two H atoms of a chain, and in which q denotes a number from 2 to 40, which, however, is sufficiently large that the segment contains at least 30 C atoms, without taking into account the C atoms of the —CO.O— radicals, in the chain, and
 c. if appropriate, with curing agents C, and, if appropriate, in the presence of accelerators, in a ratio such that 0.5 to 1.2 equivalents of polyesterpolycarboxylic acid are present per equivalent of epoxide compound, that 5/10 to 9/10 of these 0.5 to 1.2 equivalents are attributable to the polyesterpolycarboxylic acid A and the remaining 5/10 to 1/10 to the polyester-polycarboxylic acid B, and that up to 0.6 equivalent of curing agent C is present per equivalent of epoxide compound, with the proviso that, in the cases in which only difunctional epoxide compounds and difunctional polyester-polycarboxylic acids A and B are employed, the epoxide groups must be present in excess and the reaction with a curing agent C is essential.

23. Heat accumulator according to claim 1, characterised in that the crystalline substance is a casting resin.

24. Installation for the utilization of solar energy comprising a heat accumulator having at least a heat exchanger, at least one useful-heat exchanger and at least one solar energy absorber; said heat exchanger, useful-heat exchanger and solar energy absorber being connected together to form a heat transfer circuit, the heat exchanger of the heat store being embedded in a crystalline substance, the heat accumulator having a maximum operating temperature greater than the melting point of the crystalline substance, and the substance and the heat exchanger of the heat accumulator being integrated in a moulding bonded by means of cross-linked plastic.

25. Installation according to claim 24, wherein at least one solar energy absorber can be bridged.

26. Installation according to claim 24, wherein the heat accumulator has at least two zones which have different crystallite melting points and each of which has a separate heat exchanger, each of which is located in a heat transfer circuit which, in each case, contains at least one solar energy absorber and one useful-heat exchanger, the sides of the useful-heat exchangers which do not form part of the heat transfer circuit being connected in series.

27. Installation according to claim 24, wherein at least one useful-heat exchanger has electrical heaters for warming the heat transfer liquid circulating in the circuit.

* * * * *